United States Patent Office 3,790,464
Patented Feb. 5, 1974

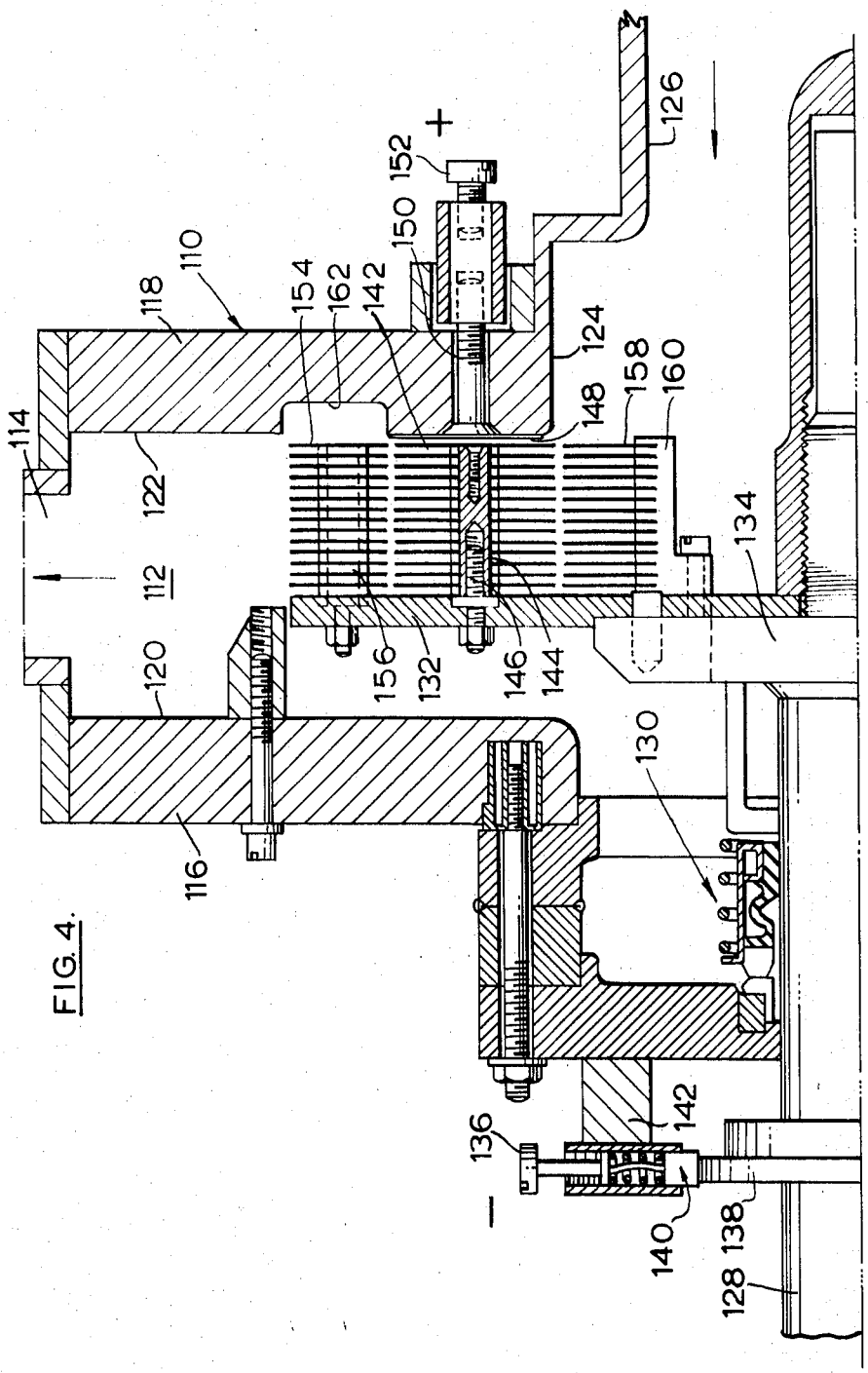

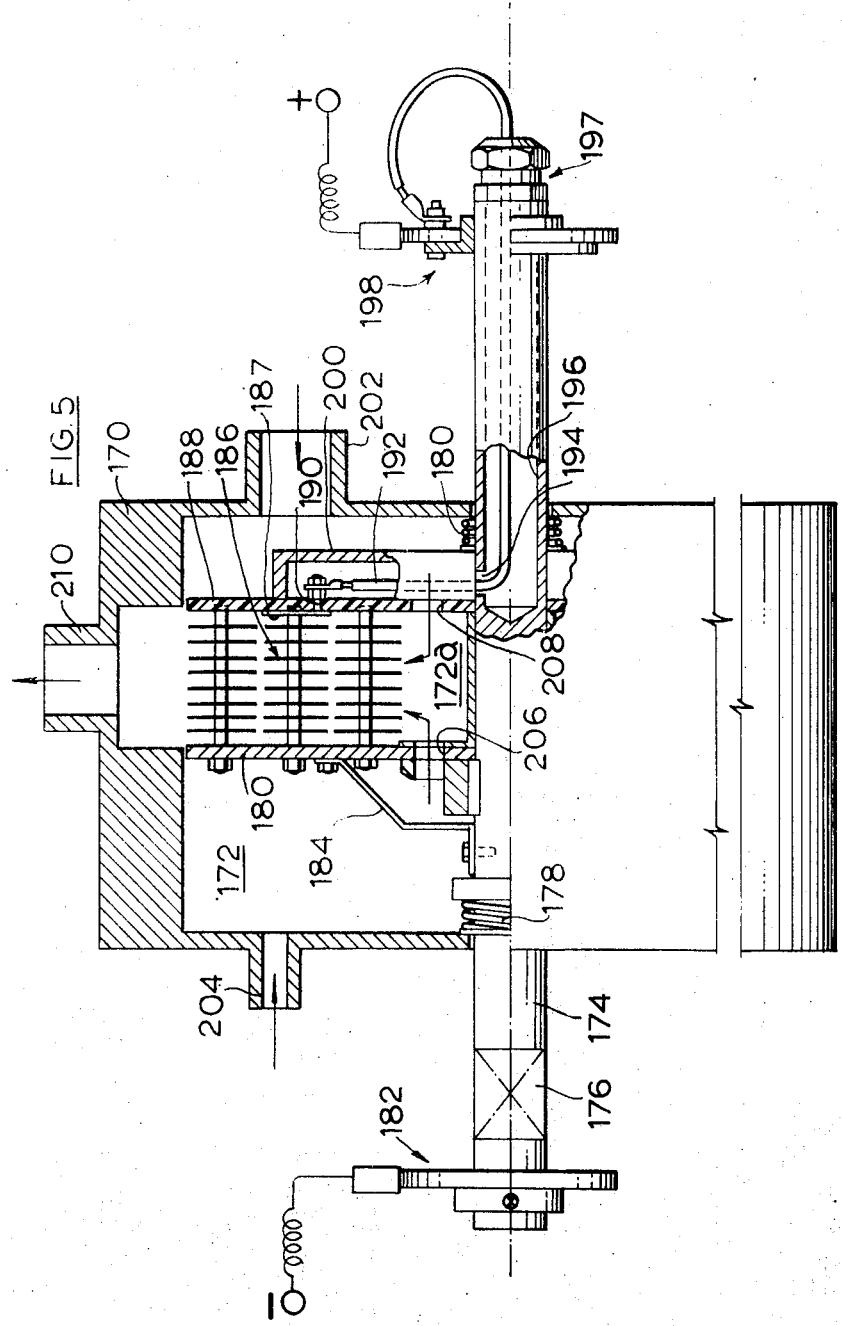

3,790,464
ELECTROLYZER INCLUDING ROTATABLE BIPOLAR ELECTRODES
Bruce Bousfield Greaves, Liverpool, England, assignor to The Cumberland Engineering Company Limited, Bootle, Lancashire, England
Filed May 30, 1972, Ser. No. 257,519
Int. Cl. C23b 5/68
U.S. Cl. 204—212                           8 Claims

ABSTRACT OF THE DISCLOSURE

The present invention comprises an electrolytic cell having a pair of terminal electrodes located within a chamber and adapted to be connected to the poles of a D.C. source. A plurality of "bipolar electrodes" are located between the terminal electrodes and are arranged to be rotatable about an axis through their centers. The electrolyte is fed to the cell at radially inner portions of the cell and withdrawn at the periphery of the cell, such that electrolyte flow is radially outward through the cell. Due to the rotation of the bipolar electrodes relative to the chamber and to electrolyte passing through the cell, the tendency for solid products of the elecrolysis process to accumulate on the electrodes is considerably reduced.

---

The present invention relates to electrolytic cells and in particular to electrolyzers for the continuous electrolysis of salt water, for example sea or esturaine water.

When an electric current is passed through seawater between two suitable metallic electrodes, migration of the various free ions in the solution occurs. $Cl^-$ ions and $OH^-$ ions move to the anode and $Na^+$ and $H^+$ ions move to the cathode. If the anodic and cathodic regions are not separated, for example by a membrane, the reaction products are free to react with each other producing in this case a hypochlorite solution.

However, in the case of seawater there is a very high percentage of magnesium salts present resulting in a comparatively high concentration of magnesium ions. Since magnesium hydroxide has a low solubility product, it is precipitated as a suspension of fine particles. This suspension tends to agglomerate in a deposition of magnesium hydroxide on the surface of the cathode electrodes in the electrolyzer which adheres to said surface of the cathode electrodes and inhibits the electrolyzing reaction. If the agglomeration of particles adhering to the surface of the cathode electrodes is allowed to build up to such an extent that bridging of the anode and cathode electrodes occurs, the cell will break down ocmpletely and corrosion of the electrodes will take place. Furthermore, if the electrodes are platinized, they will be badly damaged due to stripping of the platinum.

In one known electrolyzer this problem is obviated by arranging for the seawater to be passed through the electrolyzer at a rate such that the magnesium hydroxide either remains in solution or is dispersed by the flow of the seawater.

This system however, suffers from the intrinsic disadvantage that large volumes of water have to be moved at relatively high velocities which requires considerable expenditure of energy. It also requires much larger and more powerful pumps than would be necessary if such high flow rates did not have to be used.

It is thus an object of the present invention to provide a system in which much lower input velocities of seawater are required for the electrolyzing process than in this known system.

According to the present invention, an electrolytic cell comprises a pair of terminal electrodes located within a chamber and adapted to be connected to the poles of a D.C. source, and a plurality of bipolar electrodes which are located between the terminal electrodes, at least the bipolar electrodes rotatable about an axis through their centres.

In this specification and the claims appended thereto, the term "bipolar electrode" of an electrolytic cell is to have its accepted meaning commonly used in the art, namely, an intermediate cell electrode without metallic connection with the current supply, one surface of which acts as an anode and the opposite surface as a cathode when an electric current is passed through the cell from between two, outer "terminal electrodes."

The terminal electrodes can either be fixed relative to the chamber, or one can be fixed and the other rotatable or both terminal electrodes can be rotatable relaitve to the chamber.

The bipolar electrodes are preferably in the form of parallel, spaced apart, annular discs arranged so that they are rotatable about a common central axis. It is particularly advantageous for the bipolar electrodes to be in the form of annular discs arranged so that they are rotatable about a common central axis, an electrolyte inlet to the chamber being provided radially inwardly of the annular discs and an electrolyte outlet being provided radially outwardly of the annular discs whereby electrolyte has to flow generally radially outwardly relative to the discs when passing between said inlet and outlet.

In the aforegoing arrangement, fluid passing from the inlet to the outlet is carried around to a certain extent by the rotating bipolar electrodes, so that insoluble particles in the electrolyte are subjected to a centrifuging action and are projected radially outwardly toward said outlet.

The invention will be further described, by way of example, with reefrence to the accompanying drawings, in which:

FIG. 4 is a sectional side elevation through the upper half of a second embodiment of an electrolyzer in accordance with the present invention; and FIG. 5 is a partially sectioned side elevation through a third embodiment of an electrolyzer in accordance with the present invention.

Figure 2:
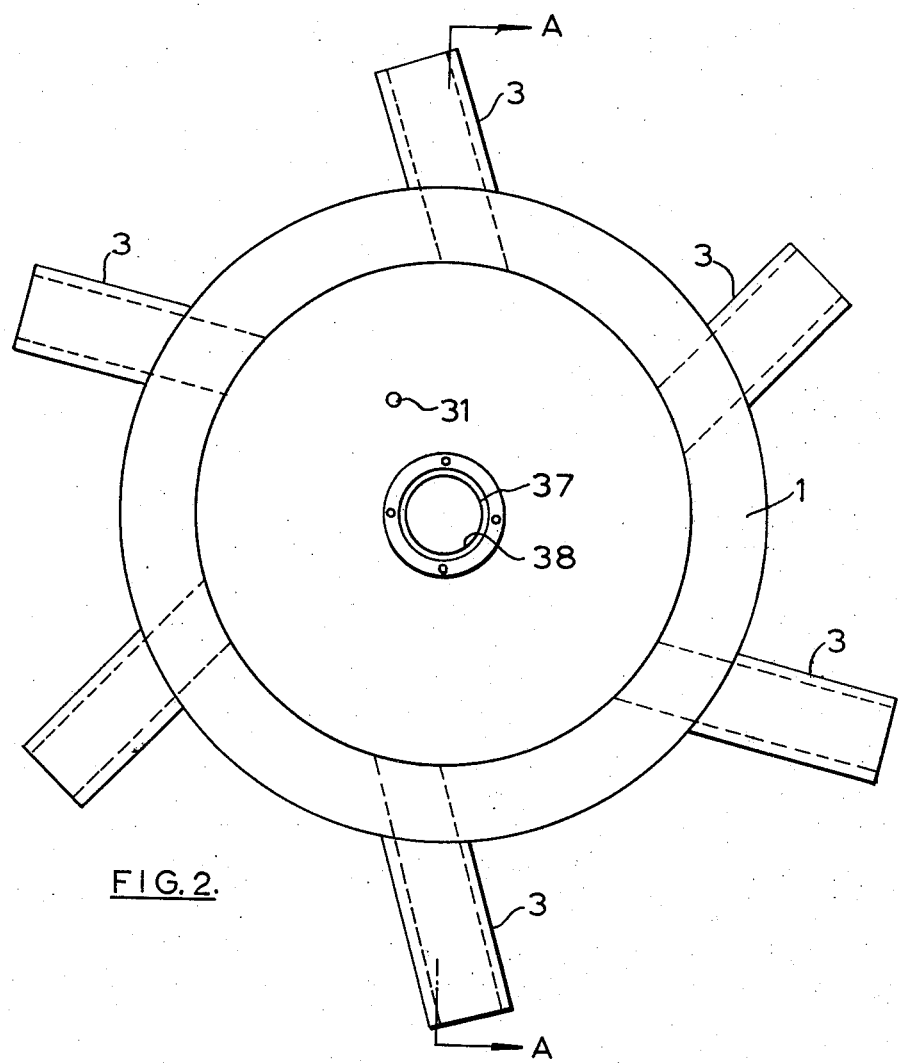
FIG. 2 is a diagrammatic front elevation of one embodiment of an electrolyzer constructed in accordance with the invention.
Figure 3:
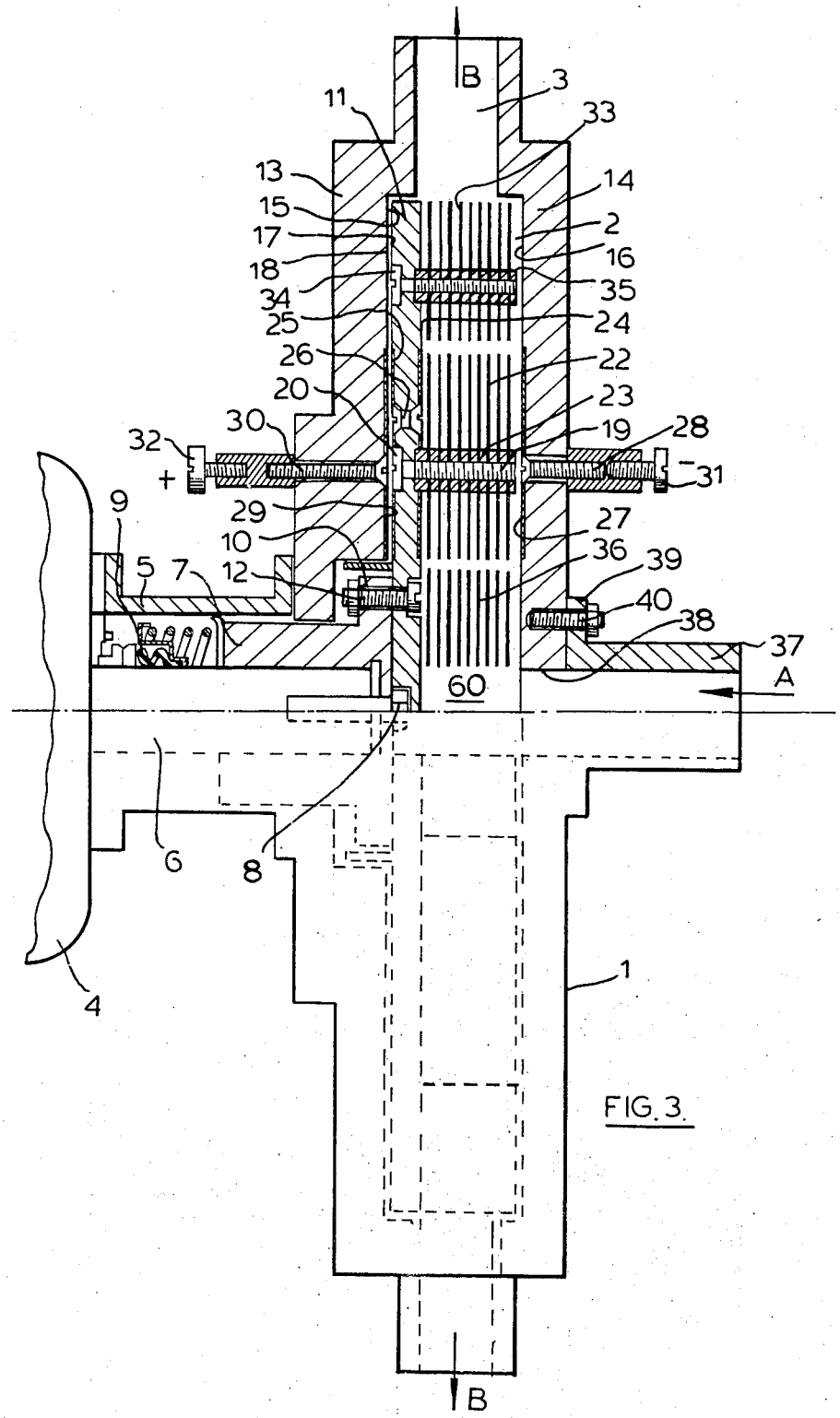
FIG. 3 is an enlarged partially sectioned side elevation along the line A—A of FIG. 2.

With reference to FIGS. 2 and 3, the illustrated electrolyzer has a substantially cylindrical main body 1 constructed largely of insulating plastics material. The body 1 has a ninternal chamber 2 of generally cylindrical shape having a number of discharge passages 3 extending outwardly therefrom. The chamber 2 has end walls 13 and 14 having opposite facing surfaces 15 and 16 respectively. The end wall 14 has a centrally located aperture 38 which communicates with a fluid inlet pipe 37. The fluid inlet pipe 37 is mounted on the body 1 by means of bolts 40 which pass through corresponding bores in a circumferential flange 39 of the pipe 37.

A motor 4 is mounted on one side of the body 1 by means of a cylindrical hollow mounting bracket 5. The motor shaft 6 is arranged to be coaxial with the internal cylindrical chamber 2 and with the inlet aperture 38, one end of the shaft extending into the end wall 13 of the body 1. A sleeve 7 is rigidly mounted on this one end of the shaft 6 by means of a bolt 8. A shaft seal 9 is arranged on the shaft 6 adjacent the motor body 4 for preventing fluid from entering the motor.

The end of the sleeve 7 remote from the motor 4 has a circumferential flange 10 to which a disc shaped mounting plate 11 of insulating material, for example Tufnol (registered trademark), is attached by bolts 12, only one of which is seen in FIG. 3. The mounting plate 11 is arranged to lie within the chamber 2 so that one surface 17 of the plate 11 is adjacent, and uniformly spaced by a small gap 18, from the wall surface 15. The mounting plate 11 has a central depression to accommodate the head of the bolt 8.

At a radius approximately midway between its axis and perimeter the mounting plate carries four bolts 19 of insulating material, for example p.t.f.e., rigidly fixed thereto at equally spaced locations around the plate, the axes of the bolt 19 being parallel to the axis of the motor shaft 6. Only one such bolt 19 is shown in FIG. 3. The heads 20 of the bolts 19 are countersunk into the plate surface 17 so that the end surface 21 of each bolt 19 is adjacent but slightly spaced from the wall surface 15. The free end of the bolt 19 projects from the opposite surface 24 of the mounting plate 11 and carries a plurality of annular titanium discs 22, only one of which is indicated in FIG. 3. The annular discs 22 equally spaced apart by insulating spacers 23 so that there is a uniform parallel gap between each pair of adjacent discs 22, the extreme right-hand spacers 23, as viewed in FIG. 3, being constructed as nuts for retaining the bolts 19 in position on the mounting plate. One surface of each annular titanium disc 22 is platinized, all the platinized surfaces being arranged, in this case to face away from the motor 4. The extreme left-hand disc 22, as viewed in FIG. 3, lies in contact with the surface 24 of the mounting plate 11 and is electrically connected to a similarly dimensioned annular plate 25 of titanium which is in engagement with the surface 17 of the mounting plate 11, the electrical connection being made by a double-heated titanium screw 26 which also serves to hold these two discs rigidly against the mounting plate 11.

A further annular disc 27 of titanium is rigidly mounted on the wall surface 16 of the chamber 2 so as to be adjacent and closely spaced by a uniform gap from the extreme right-hand disc 22, as viewed in FIG. 3. The disc 27 is electrically connected by a brass bolt 28 to a negative D.C. terminal 31 on the outside of the body 1.

A further annular disc 29 of platinized titanium is rigidly mounted on the wall surface 15 of the chamber 2 so that its platinized surface is adjacent and closely spaced by a uniform gap from the titanium annular disc 25. The disc 29 is electrically connected by a titanium bolt 30 to a positive D.C. terminal 32 on the outside of the body 1.

A plurality of annular discs 33 of insulating material, for example epoxy glass, whose outside diameter corresponds to the diameter of the mounting plate 11 and whose inside diameter is slightly greater than the outside diameter of the annular discs 22, are each aligned with a respective one of the discs 22 so as to be substantially coplanar therewith. At a radius approximately midway between their inside and outside diameters, the discs 33 are attached to the mounting plate 11 by four bolts 34 which are equally spaced around the mounting plate 11, only one being seen in FIG. 1. A plurality of insulating spacers 35 maintain the discs 33 in equally spaced relationship.

A further plurality of annular discs 36 of insulating material, for example epoxy glass, whose outside diameter is slightly less than the inside diameter of the discs 22 and whose inside diameter is substantially equal to the diameter of the bore of the flud inlet pipe 37, are each mounted on a further series of bolts (not shown) equally spaced around the mounting plate 11. The discs 36 are maintained in equally spaced relationship on these last mentioned bolts by a plurality of spacers (not shown), each discs 36 being substantially coplanar with a respective disc 22.

Thus there are a plurality of parallel spaced-apart composite discs, each having three radially distinct regions, namely an intermediate metallic region and inner and outer insulating regions, which discs are rotatable within the cylindrical chamber 2 of the electrolyzer by the motor 4. When electrolyte, for example seawater, is introduced into the inlet pipe 37 in the direction of arrow A, the fluid enters the cylindrical space 60 at the centre of the composite discs and passes radially outwardly from this space to fill the chamber and eventually to discharge through the outlets 3 in the direction of arrow b. The outlet passages 3 are connected to a common discharge conduit (not shown) for extraction of the electrolyzed fluid.

In operation, the composite discs are roted by the motor 4 and the positive and negative terminals 32 and 31 are attached to the respective poles of a suitable D.C. source. It has been found to be suitable to provide about 2 to 6 volts per pair of electrode plates. Thus, if there are 18 plates, a voltage of about 90 volts is suitable. The discs 22 act as electrodes of the "bipolar type" in that one side of each disc 22 functions as an anode and the other side functions as a cathode, only the outer two discs 27, 29 of the cell as a whole being connected to the voltage source. Electrons enter the electrolyte through one terminal electrode (here the right-hand disc 27 connected to the negative pole of the source), and are transferred in the form of ions to the adjacent, extreme right-hand disc 22 not connected to the source. There they leave the electrolyte and are transferred to this latter disc, thus giving the right-hand side of this disc the character of an anode. Further passage of the electrons is only possible from the other side of this disc from which they again enter the solution in the form of ions. This other side of this disc 22 thus acts as a cathode. In this way, the electrons pass through all of the discs 22 and finally leave the cell through the last electrode which is connected to the source of current, i.e. the left-hand disc 29. The disc 25 and the extreme left-hand disc 22 connected together by the pins 26, effectively form a single such "bipolar electrode" of the cell.

Figure 1:
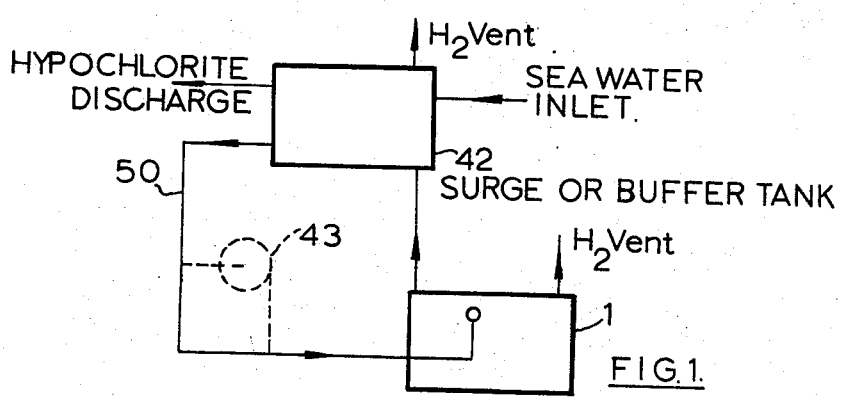
FIG. 1 is a diagram illustrating an electrolyzing system embodying an electrolyzer of the invention.

The seawater is electrolyzed during passage between the platinated titanium discs and passes out through the discharge passages 3 to a suitable surge or buffer tank 42 wherein hydrogen is released (see FIG. 1). The dehydrogenated electrolyte can return to the electrolyzer via a conduit 50 and is thus recycled until the required concentration of the electrolyte, in this case of hypochlorite, is obtained. The rotating composite discs act as a friction pump to achieve this flow of fluid between the electrolyzer and the buffer tank 42. However, a faster through-flow can be achieved by incorporating a pump 43 in the line 50 (shown dotted in FIG. 1).

During electrolysis, magnesium hydroxide and other non-soluble compounds are formed between the discs 22. However, the rotation of the composite discs serves to prevent a deposition of such compounds from building up to an extent where bridging could occur. At the radially innermost portions of discs 22, the fluid is generally moving radially outwardly and does not have a high velocity component in the direction of rotation of the discs. There is thus a high relative velocity between the fluid and the discs 22 so that insoluble particles are swept away since they are unable to adhere to the relatively fast moving discs. As the fluid moves radially outwardly along the discs 22, it is gradually accelerated by friction in the direction of rotation of the discs so that by the time it leaves the discs 22 the relative velocity of insoluble particles and the discs is low. However, since the insoluble particles are now being moved around with the discs, they are subjected to a high, radially acting, centrifugal force which throws the particles away from the discs 22 and again prevents undue deposition thereon.

Thus deposition of the insoluble particles is prevented largely by the centrifugal force on the particles due to the fluid being dragged round with the discs 22, the force increasing from a relatively small value at the radially inner portions of the discs 22 to a relatively high value at the periphery thereof.

In an alternative embodiment, the radially outer insulating discs 33 can be omitted and the discs 22 increased in diameter to occupy the space vacated by the disc 33. However, in this case it is necessary that a plurality of corresponding insulated plates be located in each of the outlet passages 3. This is necessary to prevent the current bypassing the discs 22 and short-circuiting through the fluid in the outlet passages 3 between the extreme right- and left-hand electrode plates, since the highly conductive electrolyte fluid provides a preferential path for the current compared with the path through the plates where energy has to be expended in overcoming te electrode potentials of the plates.

In a further alternative embodiment, the pump 43 can be omitted and a number of impeller blades attached to an extension of the motor shaft 6 in the region of the inlet pipe 37.

In the aforegoing embodiment of FIG. 3 in which both of the outer "terminal" electrodes (27 and 29) are stationary relative to the body of the electrolyzer, it is apparent that in operation of the electrolyzer a relatively high frictional drag force exists between the stationary inner surface 15 of the wall 13 and the adjacent surface 17 of the rotating mounting plate 11 and also between the stationary inner surface 16 of the wall 14 and the extreme right-hand, rotating composite electrode (22, 33, 36). This frictional drag force must be constantly overcome by the motor 4 during operation of the electrolyzer with a consequent expenditure of electrical energy.

The above described frictional drag force can be considerably reduced if, in accordance with the embodiment of FIG. 4 the left-hand, stationary terminal electrode is made to rotate with the mounting plate and current is supplied thereto via the motor shaft and slip rings. The separation between the mounting plate and the adjacent inner wall of the chamber can then be considerably increased with a consequent reduction in the drag force.

The electrolyzer of FIG. 4 comprises a substantially cylindrical body 110 which is again constructed largely of insualting plastics material. The body 110 defines an internal chamber 112 having a number of discharge passages 114 extending outwardly therefrom as in the embodiment of FIG. 2. The chamber 112 has end walls 116, 118 having opposite facing surfaces 120, 122 respectively. The end wall 118 has a centrally located aperture 124 which communicates with a fluid inlet pipe 126.

A motor (not shown) is mounted on the side of the body 110 (left-hand side as viewed in FIG. 4) opposite to that of the fluid inlet 126, the motor shaft 128 passing through the chamber wall 116 via a sealing gland 130 so as to extend coaxially through the chamber 112. The shaft 128 carries a mounting plate 132 in the form of an annular, stainless steel disc which is rigidly attached to a flange 134 on the shaft. The stainless steel plate 132 acts as one terminal electrode of the electrolyzer and for this purpose is electrically connected to a terminal 136, in this instance the negative terminal, via the motor shaft 128, a slip ring 138 mounted on the shaft, and a carbon brush arrangement 140 mounted on the body 110 by an insulating bush 142.

In the same manner as the insulating mounting plate 11 of FIG. 3, the stainless steel mounting plate 132 of FIG. 4 carries a plurality of annular titanium discs 142 which are equally spaced apart in parallel planes by insulating spacers 144 and supported on a number of bolts 146 attached to the mounting plate at angularly spaced locations thereon. One surface of each titanium disc is platinized, all the platinized surfaces being arranged, in this instance, to face towards the motor.

A further annular disc 148 of platinized titanium is rigidly mounted on the wall surface 122 of the chamber 112 so as to be adjacent and closely separated by a uniform gap from the extreme right-hand disc 142, as viewed in FIG. 4. The disc 148 whose platinized surface faces towards the motor side of the chamber, is electrically connected by a bolt 150 to a positive D.C. terminal 152 on the outside of the body 110.

A plurality of annular discs 154 of insulating material, for example of epoxy glass, whose outside diameter corresponds to the diameter of the mounting plate 132 and whose inside diameter is slightly greater than the outside diameter of the annular discs 142, are each aligned with a respective one of the discs 142 so as to be substantially coplanar therewith. The discs 154 are attached to the mounting plate 132 by bolts 156, only one of which can be seen in FIG. 4.

A further plurality of annular discs 158 of insulating material, for example of epoxy glass, whose outside diameter is slightly less than the inside diameter of the discs 142 and whose inside diameter is substantially equal to the diameter of the fluid inlet pipe 126, are each mounted on a number of supports 160 carried at angularly spaced intervals by the mounting plate 132. The discs 158 are mounted so that each one is substantially coplanar with a respective one of the titanium discs 142.

It will be noted that the diameter of the aperture 124 in the end wall 118 is substantially equal to the inner diameter of the annular discs 142 so that there is no stationary wall surface adjacent the extreme right-hand insulating discs 158 as there is in the case of the insulating discs 36 of FIG. 3. Furthermore, the surface 122 of the chamber wall 118 is provided with an annular recess 162 at a location facing the extreme right-hand insulating disc 154 so that there is then no stationary wall surface immediately adjacent the extreme right-hand disc 154 as there is in the case of the discs 33 of FIG. 3.

Since the negative terminal electrode is now formed by the rotating plate 132, there is no need for the surface 120 of the chamber wall 116 to be closely adjacent the plate 132 so that the frictional drag force existing therebetween during rotation of the mounting plate 132 is considerably reduced compared with the arrangement of FIG. 3.

Apart from the improvement in the frictional properties described above, the operation of the embodiment of FIG. 4 is essentially the same as that of FIGS. 2 and 3. In this case, however, the poles of the electrolyzer have been reversed so that electrons enter the solution from the stainless steel plate 132 connected to the negative terminal 136 and are transferred in the form of ions to the adjacent, left-hand titanium electrode 142. There they leave the electrolyte and are transferred to the platinized side of this latter disc, thus giving the left-hand side of this disc the character of an anode. Further passage of the electrons is only possible from the right-hand side of this disc from which they again enter the solution in the form of ions. The right-hand side of this disc thus acts as a cathode. In this way, the electrons pass through all of the discs 142 and finally leave through the extreme right-hand disc 148 which is connected to the source of current via the positive terminal 152.

As before, seawater which is passed through the apparatus is electrolyzed during passage between the platinized titanium discs 142 and passes out through the discharge passages 114 to a suitable surge or buffer tank (not shown) wherein hydrogen is released.

In a further embodiment illustrated diagrammatically in FIG. 5, both terminal electrodes are made to rotate with the motor shaft, the current entering and leaving the electrolyzer by way of slip rings carried at either end of the motor shaft. This arrangement allows the frictional drag force to be reduced even further since there is then no need for the radially extending portions of the rotating discs to be closely adjacent to a stationary chamber wall.

The electrolyzer of FIG. 5 includes a body 170 having an internal chamber 172 of substantially cylindrical shape through which extends a rotatable shaft 174 driven by a motor (not shown). The shaft 174, journalled in bearings 176, passes coaxially through the chambers via fluid seals 178, 180. As in the embodiment of FIG. 4, the motor shaft carries an annular stainless steel mounting plate 180 to which current is supplied via the motor shaft 174 and a slip ring arrangement 182.

A conductive strap 184 is provided to ensure a good electrical connection between the shaft 174 and the mounting plate 180.

As before, the mounting plate carries a plurality of composite electrodes 186 each comprising an inner insulating disc, an intermediate titanium disc and an outer insulating disc. In this case, however, the extreme right-hand composite disc 186 (numbered 187) is mounted on an annular insulating plate 188 carried by the motor shaft, direct electrical connection being made to this right-hand disc by way of a pin 190 extending through the insulating plate 188, a cable 192 which passes through an aperture 194 in the shaft 174 and extends along an interior bore 196 in the shaft, a cable sealing gland 197 and a further slip ring arrangement 198. The cable 192 is insulated from liquid in the chamber by a liquid-tight insulating cover 200 which rotates with the motor shaft.

Electrolyte enters the chamber 172 via inlet ports 202, 204 and passes through apertures 206, 208 in the mounting plate 180 and insulating plate 188 respectively to reach a chamber 172a located radially inwardly of the composite electrodes. The electrolyte then flows outwardly through the composite electrodes and discharges via ports 210.

In this instance, the terminals 182, 198 are connected to the negative and positive poles respectively of a current source, the orientation of the platinized surfaces of the titanium discs being the same as in the embodiment of FIG. 4. The operation of the electrolyzer of FIG. 5 is otherwise the same as that of the embodiment of FIG. 4.

I claim:
1. An electrolytic cell comprising:
means defining an electrolyzing chamber having a cylindrical peripheral wall;
a pair of terminal electrodes located within the chamber and adapted to be connected to the poles of a D.C. source;
a plurality of bipolar electrodes which are in the form of annular discs located in the chamber between the terminal electrodes;
means supporting said bipolar electrodes in spaced, parallel, electrically isolated relationship;
means for rotating the bipolar electrodes about a common central axis through their centers and coincident with the chamber axis;
electrolyte outlet means for the chamber located in said cylindrical wall and directed generally outwardly of the chamber axis whereby electrolyte leaving the chamber is caused to flow generally outwardly relative to the electrodes;
electrolyte inlet means for the chamber located radially inwardly of the bipolar electrodes whereby electrolyte is caused to flow radially outwardly relative to all of the electrodes when passing between said electrolyte inlet and outlet means;
and a respective annular disc of insulating material arranged parallel to and radially inwardly of each of the bipolar electrodes for preventing short-circuiting of the electrolyzing current through the electrolyte around the radially inner ends of the bipolar electrodes.

2. An electrolytic cell according to claim 1 wherein said means supporting said bipolar electrodes in spaced parallel relationship comprises a plate member and further comprising means rigidly fixing the bipolar electrodes to said plate member in parallel relationship therewith.

3. An electrolytic cell according to claim 2 wherein said means for rotating the bipolar electrodes comprises an electric motor whose shaft is rigidly connected to said plate member.

4. An electrolytic cell according to claim 1 wherein said electrolyte outlet means comprises a plurality of generally outwardly directed ducts in said cylindrical chamber wall and wherein the peripheries of the bipolar electrodes lie adjacent to said cylindrical chamber wall, and a plurality of plates of insulating material are arranged in each electrolyte outlet duct, said plates being arranged in the planes of respective ones of the bipolar electrodes for preventing short circuiting of the electrolyzing current in the regions where the radially outer edges of the bipolar electrodes face said outlet ducts.

5. An electrolytic cell comprising:
means defining an electrolyzing chamber having a cylindrical peripheral wall;
a pair of terminal electrodes located within the chamber and adapted to be connected to the poles of a D.C. source;
a plurality of bipolar electrodes which are located in the chamber between the terminal electrodes and which are in the form of annular discs;
means supporting said bipolar electrodes in spaced, parallel, electrically isolated relationship,
means for rotating the bipolar electrodes about a common central axis through their centers and coincident with the chamber axis;
electrolyte outlet means for the chamber located in said cylindrical wall radially outwardly of the bipolar electrodes and directed generally outwardly of the chamber axis whereby electrolyte leaving the chamber is caused to flow generally outwardly relative to the electrodes;
electrolyte inlet means for the chamber;
fluid guide means communicating with said electrolyte inlet and located radially inwardly of the bipolar electrodes whereby electrolyte is caused to flow radially outwardly relative to all of the electrodes when passing between said electrolyte inlet and outlet means;
and a respective annular disc of insulating material arranged parallel to and radially inwardly of each of the bipolar electrodes for preventing short-circuiting of the electrolyzing current through the electrolyte around the radially inner ends of the bipolar electrodes.

6. An electrolytic cell as claimed in claim 5 wherein said means supporting said bipolar electrodes in spaced parallel relationship comprises a plate member, and further comprising means rigidly fixing the bipolar electrodes to said plate member in parallel relationship therewith, said means for rotating the bipolar electrodes comprising an electric motor whose shaft is rigidly connected to said plate member.

7. An electrolytic cell as claimed in claim 6 wherein said plate member is metallic and serves as one of the terminal electrodes, electrical connection being made thereto via the motor shaft and slip ring means carried by the shaft.

8. An electrolytic cell as claimed in claim 7 wherein the other terminal electrode comprises a metallic disc which is mounted on the shaft for rotation therewith and further comprising an insulating plate mounted on the motor shaft which supports said metallic disc, electrical connection being made to said other electrode by way of an insulated wire which passes through a bore in the motor shaft to slip ring means which are electrically isolated from said shaft.

References Cited

UNITED STATES PATENTS

| | | | |
|---|---|---|---|
| 3,649,508 | 3/1972 | Yokota et al. | 204—212 |
| 2,839,463 | 6/1958 | Vellas et al. | 204—212 |
| 3,583,897 | 6/1971 | Fulweiler | 204—212 |
| 3,113,918 | 12/1963 | Evans | 204—268 |
| 3,119,759 | 1/1964 | Hoover | 204—212 |
| 3,196,095 | 7/1965 | Wadsworth | 204—212 |
| 3,560,366 | 2/1971 | Fisher | 204—212 |

JOHN H. MACK, Primary Examiner

W. I. SOLOMON, Assistant Examiner

U.S. Cl. X.R.

204—149, 268, 269